July 9, 1940.  G. MARK  2,206,968
SUPPORTING THE PRINTING CYLINDERS OF FABRIC PRINTING MACHINES
Filed May 6, 1939
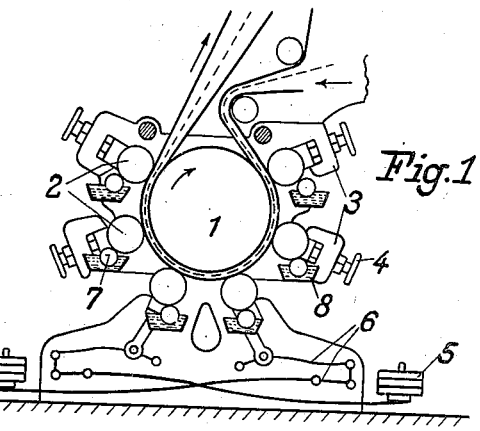
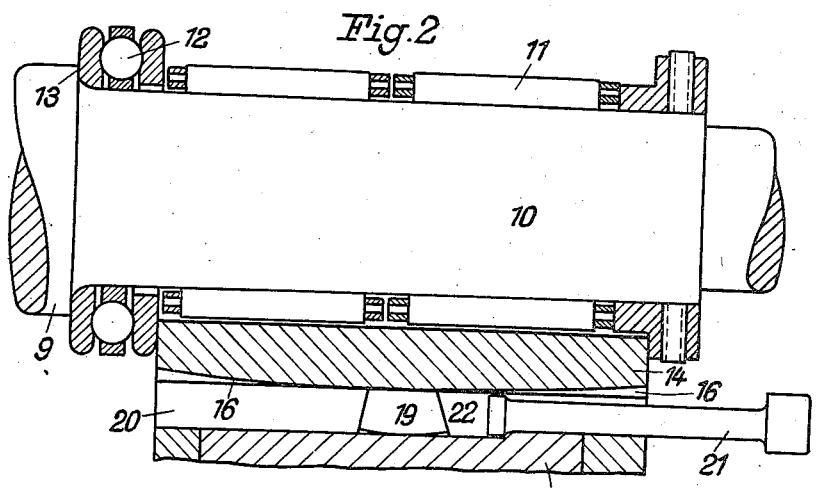
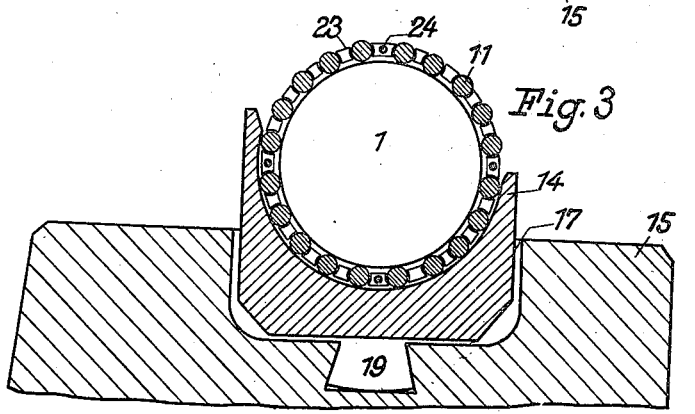
Inventor:
GUSTAV MARK
By: Richards & Geier
Attorneys Patented July 9, 1940

2,206,968

UNITED STATES PATENT OFFICE 2,206,968

SUPPORTING THE PRINTING CYLINDERS OF FABRIC PRINTING MACHINES

Gustav Mark, Herdeck, Germany

Application May 6, 1939, Serial No. 272,110
In Germany August 25, 1937

3 Claims. (Cl. 101—248)

This invention refers to positioning of printing cylinders for fabric printing machines, especially for deep-printing or copper-plate printing machines (so-called Rouleaux printing machines). Here, up to the present time, sliding bearings of bronze were generally used. This way of supporting the cylinders shows however considerable drawbacks; in consequence of the very high pressures, with which these machines must operate, in order to secure a perfect transfer of the pattern upon the fabric cylinder, a high power consumption is required for driving the machine. By this the sliding bearings soon reach very high temperatures, which, especially in case of ice-dyes, results in separation of the coloring material. Furthermore, owing to this heating, the contact of the cylinder mantle upon its axle is loosened up. As a consequence of this results a useless print. Another drawback of sliding bearings lies in the fact that the bearing itself is soon considerably worn out and in consequence of its peculiar construction can be replaced only by expenditure of much work. The construction of these sliding bearings causes, furthermore, a completely rigid support of the printing cylinders so that the latter do not adapt themselves to any possible deviations. Through this, the axles of the printing cylinders are unduly strained and frequent breakdowns occur, especially in the connection of the journal pins with the axle.

All these disadvantages could be eliminated if it were possible to utilize, for taking up radial and axial pressure, roller bearings, in themselves already known. It has been proposed before to use ball or roller bearings for positioning the axles of printing cylinders. But the introduction of roller bearings into the machines of this type presents difficulties. The latter consist, first, of the fact that only a very limited space is available, and, secondly, of the necessity of having means for a sideways displacement of the printing rollers, in order to set up and adjust the various patterns.

It is an object of this invention to eliminate these difficulties; another object resides in the possibility of a free side-ways adjustment as well as also of an axial adjustment of the bearings. To this end, the invention utilizes the principle, known in itself, of arranging roller bearings in a sliding member, As against such known arrangements the present invention consists in the feature that the roller bearing is located in a bearing head, which is demountably arranged together with an inserted slide member in the bearing block, which slide member presents as the sole guidance a pin arranged at its underside and engaging a slot in the bearing head, said underside tapering from the center towards both ends; against this pin abuts through a pressure member a pressure rod, arranged to displace the bearing in its longitudinal axis. It is of practical advantage to have the guiding slot trapezoidal in section and the guiding pin conical and convex upon its lower face.

In this manner it will be possible to secure a positioning such that the well known properties of roller bearings may also be applied to machines of the type in question.

The above and other details of the invention can be gathered from the annexed drawing which represents a constructional example.

Fig. 1 is a schematic side view of a cylinder printing machine.

Fig. 2 is a longitudinal section and

Fig. 3 a cross-section through a bearing constructed in accordance with the invention.

The Rouleaux printing machine consists of a drum 1 (so-called Presseur) over which runs the fabric to be printed, together with the undercloth and the protective cloth. According to the number of colours the printing cylinders 2 are arranged around the drum 1. The printing cylinders are demountably arranged within the brackets 3 and exert a certain pressure upon the drum through the action of hand screws 4, and under the drum, through the working of counter weights 5, which operate through the link mechanism 6. Below the printing cylinders 2 the so-called ink rollers (or dipping rollers) 7 are arranged, which pick up the dye from the containers 8 and transfer it to the printing rollers 2. The pattern of such printing rollers is etched out in hollow cylinders, which may be made of copper, brass, light metal, iron and like metals, or also of rubber or artificial resin materials, and are then, in form of slightly tapering cones, pressed upon the printing roller axles 9.

Now, according to this invention, the journal ends 10 of the printing roller axles 9 are positioned in roller bearings 11, whereof the rollers are held in alignment by cages 23 kept together by bolts 24. The roller bearing abuts, through the ball bearing 12, against the shoulder plate 13 of the cylinder axle and is positioned in the sliding piece 14; this, in turn, is arranged within a so-called bearing head 15, so that it can move or oscillate either sideways or in a longitudinal direction and, in addition, is adjustable, longitudinally. This whole arrangement is located in the brackets 3. The arrangement permitting transverse or longitudinal displacements, as also oscillatory motion, is, in this constructional example, effected through the fact that the underside of the sliding block 14, as is shown in Fig. 2, is made, from the center outward in form of inclined planes 16. At the sides, between the sliding block 14 and the bearing head 15 there is a sufficient clearance 17. The sliding member is guided by means of a conical pin 19 in the slot 20 of the bearing head. This pin 19 is made convex at its lower surface. By means of this construction the result is obtained that the sliding member may move or oscillate in any direction. The pin 19 is preferably made round. The displacement in longitudinal sense will be effected by means of the push-rod 21, which acts upon the pin 19 through the piece 22 and displaces it against the ball thrust bearing 12. In doing this, both the sliding block and the roller bearing are pushed towards the thrust bearing. Through the arrangement as above described, a very easy running of the cylinders will be secured. The wear upon the front-faces is practically eliminated through the introduction of the ball thrust bearing. The bearing can adapt itself to the position of the printing cylinder and adjusts itself automatically. Canting or jamming of the printing cylinders and thus the transfer of bending stresses is avoided. Likewise, the heating of bearings and also of the printing cylinders is eliminated and a substantially reduced power consumption results.

What I claim is:

1. In an arrangement for supporting the printing cylinders of so-called Rouleaux printing machines, a roller bearing for each cylinder, a channel-like bearing head exchangeably positioned in a bracket and providing a longitudinal bed adapted to receive the roller bearing, a slide member inserted into said bed between the bearing and the bearing head, said slide member being tapered at its underside in a longitudinal direction toward both ends and being solely guided by a pin centrally mounted at said underside and engaging a longitudinal slot of said bed.

2. In an arrangement as set forth in claim 1 a push rod, a pressure piece, said rod extending into said slot and being adapted to shift said pin through said pressure piece.

3. In an arrangement as set forth in claim 1 said slot and said pin being a trapezoidal cross-section, said pin having a convex underside, and a sufficient clearance being provided between said slide member and said bed.

GUSTAV MARK.